US012506635B2

(12) United States Patent
Shoesmith et al.

(10) Patent No.: US 12,506,635 B2
(45) Date of Patent: Dec. 23, 2025

(54) MULTI-NETWORK PLAYBACK DEVICES

(71) Applicant: Sonos, Inc., Santa Barbara, CA (US)

(72) Inventors: William Shoesmith, Arlington, MA (US); Jason Yore, Santa Barbara, CA (US); Jeffrey M. Peters, Cambridge, MA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 18/443,526

(22) Filed: Feb. 16, 2024

(65) Prior Publication Data

US 2024/0275632 A1   Aug. 15, 2024

Related U.S. Application Data

(63) Continuation of application No. 18/086,957, filed on Dec. 22, 2022, now Pat. No. 11,909,550, which is a continuation of application No. 16/544,806, filed on Aug. 19, 2019, now Pat. No. 11,539,545.

(51) Int. Cl.
*H04L 12/28* (2006.01)
*H04W 84/12* (2009.01)

(52) U.S. Cl.
CPC .......... *H04L 12/282* (2013.01); *H04L 12/281* (2013.01); *H04L 12/2812* (2013.01); *H04L 12/2814* (2013.01); *H04W 84/12* (2013.01)

(58) Field of Classification Search
CPC .................................................. H04L 12/282
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| (Continued) | | |

FOREIGN PATENT DOCUMENTS

| | | |
|---|---|---|
| CN | 105144825 A | 12/2015 |
| CN | 108419305 A | 8/2018 |
| (Continued) | | |

OTHER PUBLICATIONS

AudioTron Quick Start Guide, Version 1.0, Mar. 2001, 24 pages.
(Continued)

*Primary Examiner* — Guang W Li

(57) ABSTRACT

A playback device includes programming for connecting to a first wireless local area network (WLAN) and storing a first set of network configuration parameters including an identifier of the first WLAN and a first security parameter for the first WLAN. The functions also include disconnecting from the first WLAN, receiving a second set of network configuration parameters including an identifier of a second WLAN and a second security parameter for the second WLAN, and storing the second set of network configuration parameters. The functions also include reconnecting to the first WLAN using the stored first set of network configuration parameters and, after reconnecting to the first WLAN, transmitting, absent user request, the second set of network configuration parameters to at least one other playback device that is connected to the first WLAN for storage on the at least one other playback device that is connected to the first WLAN.

20 Claims, 7 Drawing Sheets

(56) References Cited

U.S. PATENT DOCUMENTS

| | | | |
|---|---|---|---|
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,983,615 | B2 | 7/2011 | Bryce et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,224,303 | B2 * | 7/2012 | White .................... H04H 20/72 455/414.3 |
| 8,234,395 | B2 | 7/2012 | Millington |
| 8,483,853 | B1 | 7/2013 | Lambourne |
| 8,942,252 | B2 | 1/2015 | Balassanian et al. |
| 10,593,174 | B1 * | 3/2020 | Yoon .................. H04L 12/2816 |
| 10,616,808 | B2 * | 4/2020 | Mohan ..................... H04L 63/18 |
| 10,893,087 | B1 * | 1/2021 | Munoz ................. H04L 67/563 |
| 10,972,556 | B1 * | 4/2021 | Cheng .................... H04L 67/52 |
| 11,182,427 | B2 * | 11/2021 | Maharajh ............... H04L 67/10 |
| 11,487,700 | B1 * | 11/2022 | Per ......................... G06F 16/113 |
| 11,675,836 | B2 * | 6/2023 | Maharajh ............. G06F 16/487 725/34 |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2005/0153650 | A1 * | 7/2005 | Hikomoto ................. H04L 1/06 455/3.01 |
| 2007/0142944 | A1 | 6/2007 | Goldberg et al. |
| 2007/0157220 | A1 | 7/2007 | Cordray et al. |
| 2010/0020746 | A1 | 1/2010 | Zaks |
| 2013/0073584 | A1 | 3/2013 | Kuper et al. |
| 2014/0161103 | A1 | 6/2014 | Sirotkin et al. |
| 2014/0230015 | A1 | 8/2014 | Pollock |
| 2014/0366105 | A1 | 12/2014 | Bradley et al. |
| 2015/0023341 | A1 | 1/2015 | Zhao et al. |
| 2015/0229639 | A1 * | 8/2015 | Abdulrahiman .... H04L 63/0853 455/411 |
| 2015/0327060 | A1 | 11/2015 | Gilson et al. |
| 2016/0157131 | A1 * | 6/2016 | Chaudhuri ........ H04W 36/0058 370/236 |
| 2016/0286253 | A1 | 9/2016 | Roskind et al. |
| 2017/0013556 | A1 | 1/2017 | Tanaka et al. |
| 2017/0071022 | A1 | 3/2017 | Sampath et al. |
| 2017/0111517 | A1 * | 4/2017 | Vanover ................ H04M 15/58 |
| 2018/0365250 | A1 * | 12/2018 | Maharajh ......... H04N 21/23424 |
| 2019/0007574 | A1 | 1/2019 | Takarabe |
| 2019/0090176 | A1 | 3/2019 | Peters et al. |
| 2019/0116087 | A1 * | 4/2019 | Hiller ....................... H04W 4/70 |
| 2019/0138553 | A1 * | 5/2019 | Maharajh ........... H04N 21/6112 |
| 2019/0394588 | A1 | 12/2019 | Goldstein et al. |
| 2020/0117419 | A1 | 4/2020 | Kusano |
| 2021/0204337 | A1 | 7/2021 | Yang et al. |
| 2022/0286356 | A1 | 9/2022 | Shoesmith et al. |

FOREIGN PATENT DOCUMENTS

| | | |
|---|---|---|
| EP | 1389853 A1 | 2/2004 |
| WO | 200153994 | 7/2001 |
| WO | 2003093950 A2 | 11/2003 |
| WO | 2019108648 A1 | 6/2019 |
| WO | 2023056336 A1 | 4/2023 |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Chinese Patent Office, First Office Action and Translation mailed on Dec. 19, 2023, issued in connection with Chinese Application No. 202080072682, 13 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Search Report and Written Opinion mailed on Oct. 27, 2020, issued in connection with International Application No. PCT/US2020/047008, filed on Aug. 19, 2020, 10 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action mailed on Sep. 10, 2021, issued in connection with U.S. Appl. No. 16/544,806, filed Aug. 19, 2019, 13 pages.
Non-Final Office Action mailed on Jun. 16, 2023, issued in connection with U.S. Appl. No. 18/086,957, filed Dec. 22, 2022, 9 pages.
Non-Final Office Action mailed on Apr. 26, 2022, issued in connection with U.S. Appl. No. 16/544,806, filed Aug. 19, 2019, 15 pages.
Notice of Allowance mailed on Nov. 18, 2022, issued in connection with U.S. Appl. No. 16/544,806, filed Aug. 19, 2019, 10 pages.
Notice of Allowance mailed on Oct. 5, 2023, issued in connection with U.S. Appl. No. 18/086,957, filed Dec. 22, 2022, 10 pages.
Palm, Inc., "Handbook for the Palm VII Handheld," May 2000, 311 pages.
Presentations at WinHEC 2000, May 2000, 138 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.
Australian Patent Office, Australian Examination Report Action mailed on Jan. 20, 2025, issued in connection with Australian Application No. 2020333771, 2 pages.
Chinese Patent Office, Second Office Action mailed on Aug. 5, 2024, issued in connection with Chinese Application No. 202080072682, 11 pages.

(56) References Cited

OTHER PUBLICATIONS

European Patent Office, European EPC Article 94.3 mailed on Nov. 19, 2024, issued in connection with European Application No. 20764277.8, 6 pages.

* cited by examiner

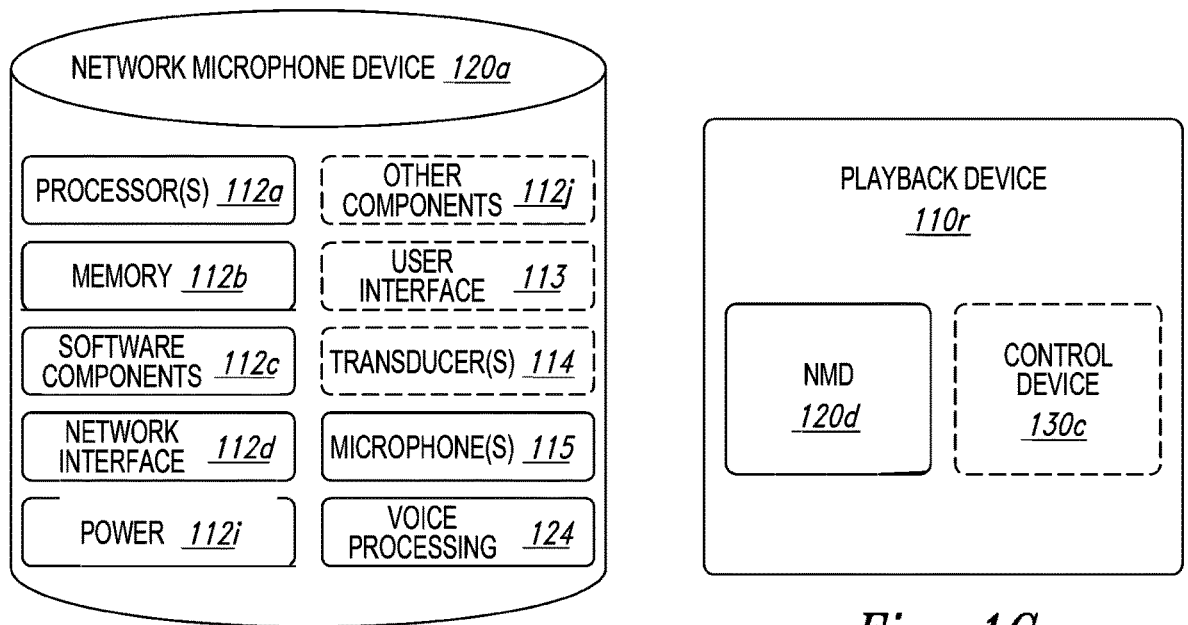
Fig. 1F
Fig. 1G
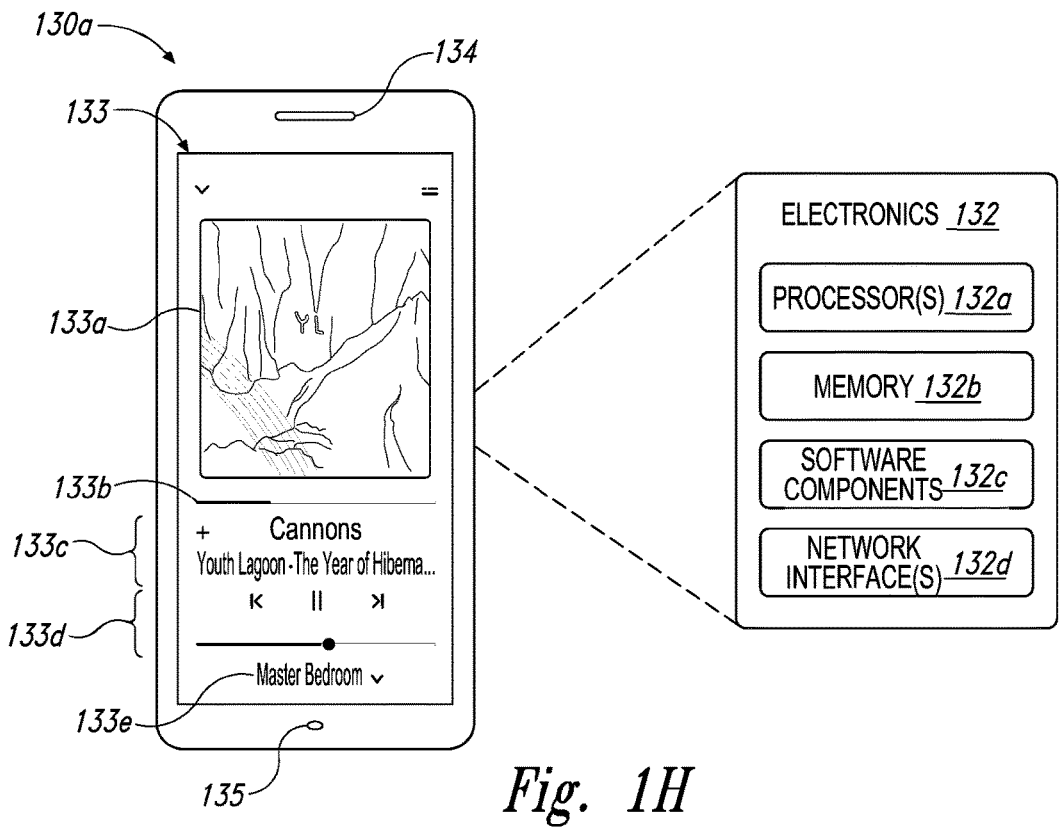
Fig. 1H

| | VERSION # |
|---|---|
| IDENTIFIER | SECURITY PARAMETER |
| SSID$_1$ | KEY$_1$ |
| SSID$_2$ | KEY$_2$ |
| SSID$_3$ | KEY$_3$ |
| ⋮ | ⋮ |
| SSID$_N$ | KEY$_N$ |

FIG. 3

MULTI-NETWORK PLAYBACK DEVICES

CROSS-REFERENCE TO RELATED APPLICATIONS

This application claims the benefit of priority as a continuation under 35 U.S.C. § 120 to U.S. application Ser. No. 18/086,957 filed on Dec. 22, 2022 and entitled "Multi-Network Playback Devices," which is a continuation of U.S. application Ser. No. 16/544,806 filed on Aug. 19, 2019 and entitled "Multi-Network Playback Devices," each of which is incorporated by reference in its entirety.

FIELD OF THE DISCLOSURE

The present disclosure is related to consumer goods and, more particularly, to methods, systems, products, features, services, and other elements directed to media playback or some aspect thereof.

BACKGROUND

Options for accessing and listening to digital audio in an out-loud setting were limited until in 2002, when SONOS, Inc. began development of a new type of playback system. Sonos then filed one of its first patent applications in 2003, entitled "Method for Synchronizing Audio Playback between Multiple Networked Devices," and began offering its first media playback systems for sale in 2005. The Sonos Wireless Home Sound System enables people to experience music from many sources via one or more networked playback devices. Through a software control application installed on a controller (e.g., smartphone, tablet, computer, voice input device), one can play what she wants in any room having a networked playback device. Media content (e.g., songs, podcasts, video sound) can be streamed to playback devices such that each room with a playback device can play back corresponding different media content. In addition, rooms can be grouped together for synchronous playback of the same media content, and/or the same media content can be heard in all rooms synchronously.

BRIEF DESCRIPTION OF THE DRAWINGS

Features, aspects, and advantages of the presently disclosed technology may be better understood with regard to the following description, appended claims, and accompanying drawings, as listed below. A person skilled in the relevant art will understand that the features shown in the drawings are for purposes of illustrations, and variations, including different and/or additional features and arrangements thereof, are possible.

FIG. 1F is a block diagram of a network microphone device.

FIG. 1G is a block diagram of a playback device.

FIG. 1H is a partially schematic diagram of a control device.

FIG. 3 is a list of stored network configuration parameters, according to an example implementation.

Figure 1A:
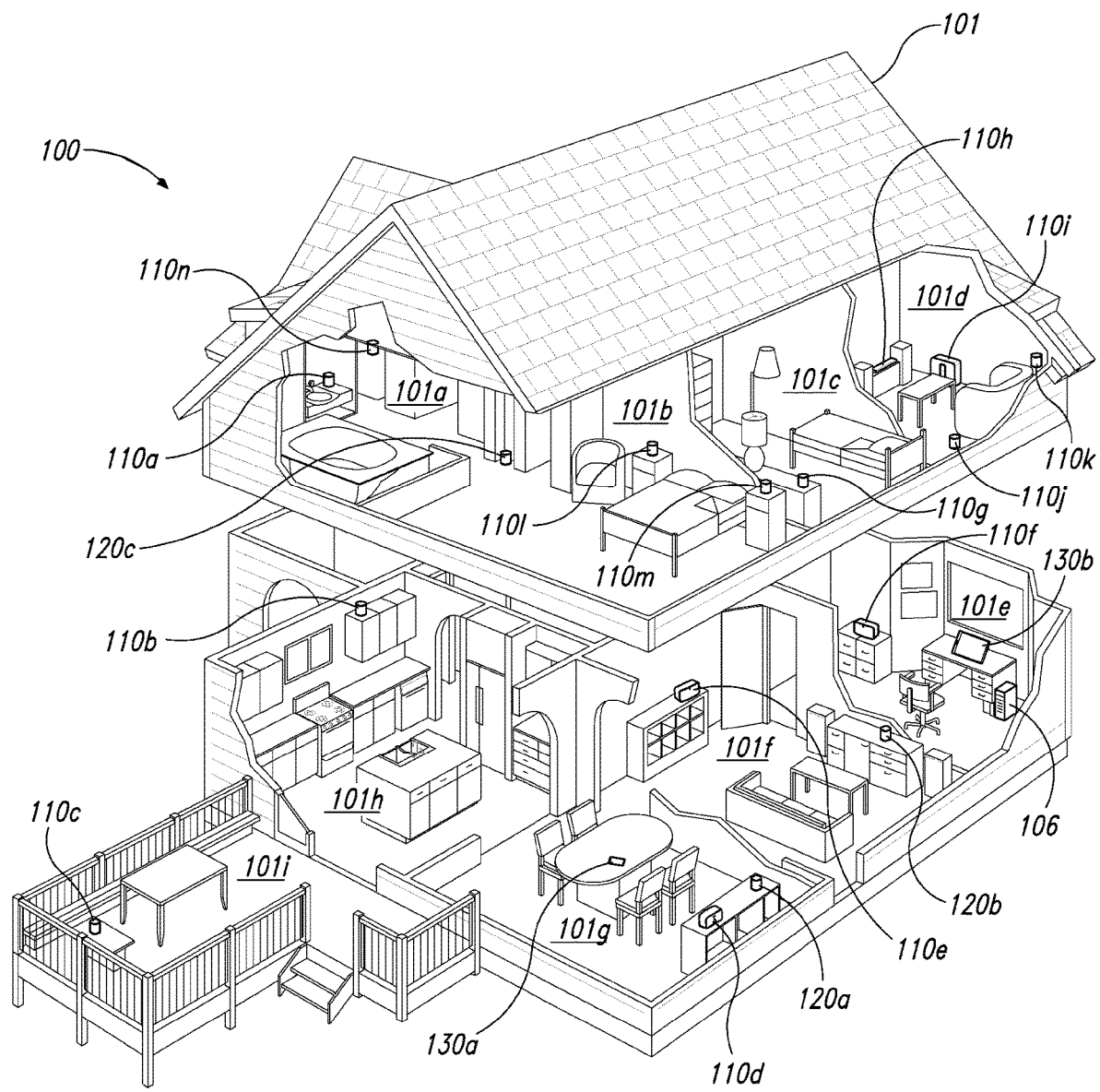
FIG. 1A is a partial cutaway view of an environment having a media playback system configured in accordance with aspects of the disclosed technology.

The drawings are for the purpose of illustrating example embodiments, but those of ordinary skill in the art will understand that the technology disclosed herein is not limited to the arrangements and/or instrumentality shown in the drawings.

DETAILED DESCRIPTION

I. Overview

Embodiments described herein relate to propagating network configuration parameters among a plurality of media playback devices that may be connected to different wireless local area networks (WLANs) at different times. In particular, the embodiments herein discuss a playback device that may disconnect from a first WLAN and then receive and store network configuration parameters for connecting to a second WLAN. When the playback device reconnects to the first WLAN, it automatically passes the configuration parameters for the second WLAN to one or more other playback devices that are connected to the first WLAN. This may allow the other playback devices to seamlessly connect to the second WLAN.

In many existing networked media playback systems that operate over a WLAN, adding a new playback device (or the first playback device) to the system involves providing the playback device with network configuration parameters for connecting to the WLAN. Wireless network configuration parameters generally include a network identifier, which is frequently expressed as a service set identifier (SSID). In many cases, the network configuration parameters also include a security key or password that, when paired with the network identifier, enables to the playback device to connect to the WLAN and thereby join the networked media playback system.

Conventionally, setting up each device of a networked media playback system in this way is accomplished once, for the WLAN on which the playback device will operate. In some cases, the network configuration parameters might be updated, such as when a listener purchases a new access point. In such a situation, each playback device must be provided with the new network configuration parameters.

However, as increasingly more livable spaces are provided with WLAN coverage, and as the capability of high-quality, portable playback devices improves, it may become more common for a playback device to move between two or more WLANs. For example, a listener may take one or more of her playback devices with her when she visits a friend's or relative's house, goes to her workplace, or rents a vacation home for a week. As another possibility, a playback device may move between two WLANs that are provided by the same access point. For instance, the listener may switch her playback device from being connected to 2.4 GHz frequency band to a 5.0 GHz frequency band of a single access point within her own house.

In the examples discussed above, a conventional playback device undergoes a setup process each time it moves from a first WLAN to a second WLAN. For example, a listener may bring her playback device when visiting a friend's house and may provide her playback device with the network configuration parameters for her friend's WLAN. She might, for instance, provide her playback device with the network configuration parameters via a handheld control device, such as her smartphone, after the smartphone is already connected to the friend's WLAN.

However, after connecting to the friend's WLAN, the listener's playback device is no longer configured to connect to her own WLAN. When she returns home with her playback device, she will need to set up the playback device again by providing it with the network configuration parameters for her own WLAN, allowing the playback device to reconnect and thereby rejoin her other playback devices for networked, synchronous operation. Each time the listener moves any of her playback device between WLANs in this way, she will need to repeat the setup process.

To improve on these and other aspects, the examples discussed herein provide for playback devices that may maintain network configuration parameters for multiple different WLANs in memory, allowing the playback device to seamlessly connect to WLANs where it has previously been set up. Further, each playback device may subscribe to the respective lists of WLANs maintained by each other playback device that it comes in communication with. This may allow the playback devices to automatically propagate stored network configuration parameters among themselves, minimizing the number of setup operations that must be performed by the listener, and increasing the portability of each playback device.

For example, the listener discussed above will be able to return home from her friend's house and have her portable playback device seamlessly reconnect to her own WLAN. Upon doing so, each other playback device on her home network will update its own list of network configuration parameters with those of the friend's WLAN, receiving them from the portable playback device. Thereafter, the listener can take the same portable playback device or a different one of her playback devices back to her friend's house. Either will reconnect seamlessly to her friend's WLAN using the stored network configuration parameters. Numerous other possibilities exist.

In some embodiments, for example, a playback device is provided including at least one processor, a non-transitory computer-readable medium, and program instructions stored on the non-transitory computer-readable medium that, when executed by the at least one processor, cause the playback device to perform functions. The functions include, after connecting to a first wireless local area network (WLAN), storing a first set of network configuration parameters including an identifier of the first WLAN and a first security parameter for the first WLAN, where at least one other device is connected to the first WLAN. The functions also include disconnecting from the first WLAN and, after disconnecting from the first WLAN, receiving a second set of network configuration parameters including an identifier of a second WLAN and a second security parameter for the second WLAN. The functions also include storing the second set of network configuration parameters and, after storing the second set of network configuration parameters, reconnecting to the first WLAN using the stored first set of network configuration parameters. The functions also include, after reconnecting to the first WLAN, transmitting, absent user request, the second set of network configuration parameters to the at least one other playback device that is connected to the first WLAN for storage on the at least one other playback device that is connected to the first WLAN.

In another aspect, a non-transitory computer-readable medium in provided. The non-transitory computer-readable medium is provisioned with program instructions that are executable to cause a playback device to perform functions. The functions include, after connecting to a first wireless local area network (WLAN), storing a first set of network configuration parameters including an identifier of the first WLAN and a first security parameter for the first WLAN, where at least one other device is connected to the first WLAN. The functions also include disconnecting from the first WLAN and, after disconnecting from the first WLAN, receiving a second set of network configuration parameters including an identifier of a second WLAN and a second security parameter for the second WLAN. The functions also include storing the second set of network configuration parameters and, after storing the second set of network configuration parameters, reconnecting to the first WLAN using the stored first set of network configuration parameters. The functions also include, after reconnecting to the first WLAN, transmitting, absent user request, the second set of network configuration parameters to the at least one other playback device that is connected to the first WLAN for storage on the at least one other playback device that is connected to the first WLAN.

In another aspect, a method carried out by a playback device includes, after connecting to a first wireless local area network (WLAN), storing a first set of network configuration parameters including an identifier of the first WLAN and a first security parameter for the first WLAN, where at least one other device is connected to the first WLAN. The functions also include disconnecting from the first WLAN and, after disconnecting from the first WLAN, receiving a second set of network configuration parameters including an identifier of a second WLAN and a second security parameter for the second WLAN. The functions also include storing the second set of network configuration parameters and, after storing the second set of network configuration parameters, reconnecting to the first WLAN using the stored first set of network configuration parameters. The functions also include, after reconnecting to the first WLAN, transmitting, absent user request, the second set of network configuration parameters to the at least one other playback device that is connected to the first WLAN for storage on the at least one other playback device that is connected to the first WLAN.

While some examples described herein may refer to functions performed by given actors such as "users," "listeners," and/or other entities, it should be understood that this is for purposes of explanation only. The claims should not be interpreted to require action by any such example actor unless explicitly required by the language of the claims themselves.

In the Figures, identical reference numbers identify generally similar, and/or identical, elements. To facilitate the discussion of any particular element, the most significant digit or digits of a reference number refers to the Figure in which that element is first introduced. For example, element 110a is first introduced and discussed with reference to FIG. 1A. Many of the details, dimensions, angles and other features shown in the Figures are merely illustrative of particular embodiments of the disclosed technology. Accordingly, other embodiments can have other details, dimensions, angles and features without departing from the spirit or scope of the disclosure. In addition, those of ordinary skill in the art will appreciate that further embodiments of the various disclosed technologies can be practiced without several of the details described below.

II. Suitable Operating Environment

FIG. 1A is a partial cutaway view of a media playback system 100 distributed in an environment 101 (e.g., a house). The media playback system 100 comprises one or more playback devices 110 (identified individually as playback devices 110a-n), one or more network microphone devices ("NMDs"), 120 (identified individually as NMDs 120a-c), and one or more control devices 130 (identified individually as control devices 130a and 130b).

As used herein the term "playback device" can generally refer to a network device configured to receive, process, and output data of a media playback system. For example, a playback device can be a network device that receives and processes audio content. In some embodiments, a playback device includes one or more transducers or speakers powered by one or more amplifiers. In other embodiments, however, a playback device includes one of (or neither of) the speaker and the amplifier. For instance, a playback device can comprise one or more amplifiers configured to drive one or more speakers external to the playback device via a corresponding wire or cable.

Moreover, as used herein the term NMD (i.e., a "network microphone device") can generally refer to a network device that is configured for audio detection. In some embodiments, an NMD is a stand-alone device configured primarily for audio detection. In other embodiments, an NMD is incorporated into a playback device (or vice versa).

The term "control device" can generally refer to a network device configured to perform functions relevant to facilitating user access, control, and/or configuration of the media playback system 100.

Each of the playback devices 110 is configured to receive audio signals or data from one or more media sources (e.g., one or more remote servers, one or more local devices) and play back the received audio signals or data as sound. The one or more NMDs 120 are configured to receive spoken word commands, and the one or more control devices 130 are configured to receive user input. In response to the received spoken word commands and/or user input, the media playback system 100 can play back audio via one or more of the playback devices 110. In certain embodiments, the playback devices 110 are configured to commence playback of media content in response to a trigger. For instance, one or more of the playback devices 110 can be configured to play back a morning playlist upon detection of an associated trigger condition (e.g., presence of a user in a kitchen, detection of a coffee machine operation). In some embodiments, for example, the media playback system 100 is configured to play back audio from a first playback device (e.g., the playback device 100a) in synchrony with a second playback device (e.g., the playback device 100b). Interactions between the playback devices 110, NMDs 120, and/or control devices 130 of the media playback system 100 configured in accordance with the various embodiments of the disclosure are described in greater detail below with respect to FIGS. 1B-1H.

In the illustrated embodiment of FIG. 1A, the environment 101 comprises a household having several rooms, spaces, and/or playback zones, including (clockwise from upper left) a master bathroom 101a, a master bedroom 101b, a second bedroom 101c, a family room or den 101d, an office 101e, a living room 101f, a dining room 101g, a kitchen 101h, and an outdoor patio 101i. While certain embodiments and examples are described below in the context of a home environment, the technologies described herein may be implemented in other types of environments. In some embodiments, for example, the media playback system 100 can be implemented in one or more commercial settings (e.g., a restaurant, mall, airport, hotel, a retail or other store), one or more vehicles (e.g., a sports utility vehicle, bus, car, a ship, a boat, an airplane), multiple environments (e.g., a combination of home and vehicle environments), and/or another suitable environment where multi-zone audio may be desirable.

The media playback system 100 can comprise one or more playback zones, some of which may correspond to the rooms in the environment 101. The media playback system 100 can be established with one or more playback zones, after which additional zones may be added, or removed to form, for example, the configuration shown in FIG. 1A. Each zone may be given a name according to a different room or space such as the office 101e, master bathroom 101a, master bedroom 101b, the second bedroom 101c, kitchen 101h, dining room 101g, living room 101f, and/or the balcony 101i. In some aspects, a single playback zone may include multiple rooms or spaces. In certain aspects, a single room or space may include multiple playback zones.

In the illustrated embodiment of FIG. 1A, the master bathroom 101a, the second bedroom 101c, the office 101e, the living room 101f, the dining room 101g, the kitchen 101h, and the outdoor patio 101i each include one playback device 110, and the master bedroom 101b and the den 101d include a plurality of playback devices 110. In the master bedroom 101b, the playback devices 110l and 110m may be configured, for example, to play back audio content in synchrony as individual ones of playback devices 110, as a bonded playback zone, as a consolidated playback device, and/or any combination thereof. Similarly, in the den 101d, the playback devices 110h-j can be configured, for instance, to play back audio content in synchrony as individual ones of playback devices 110, as one or more bonded playback devices, and/or as one or more consolidated playback devices. Additional details regarding bonded and consolidated playback devices are described below with respect to FIGS. 1B and 1E.

In some aspects, one or more of the playback zones in the environment 101 may each be playing different audio content. For instance, a user may be grilling on the patio 101i and listening to hip hop music being played by the playback device 110c while another user is preparing food in the kitchen 101h and listening to classical music played by the playback device 110b. In another example, a playback zone may play the same audio content in synchrony with another playback zone. For instance, the user may be in the office 101e listening to the playback device 110f playing back the same hip-hop music being played back by playback device 110c on the patio 101i. In some aspects, the playback devices 110c and 110f play back the hip-hop music in synchrony such that the user perceives that the audio content is being played seamlessly (or at least substantially seamlessly) while moving between different playback zones. Additional details regarding audio playback synchronization among playback devices and/or zones can be found, for example, in U.S. Pat. No. 8,234,395 entitled, "System and method for synchronizing operations among a plurality of independently clocked digital data processing devices," which is incorporated herein by reference in its entirety.

a. Suitable Media Playback System

Figure 1B:
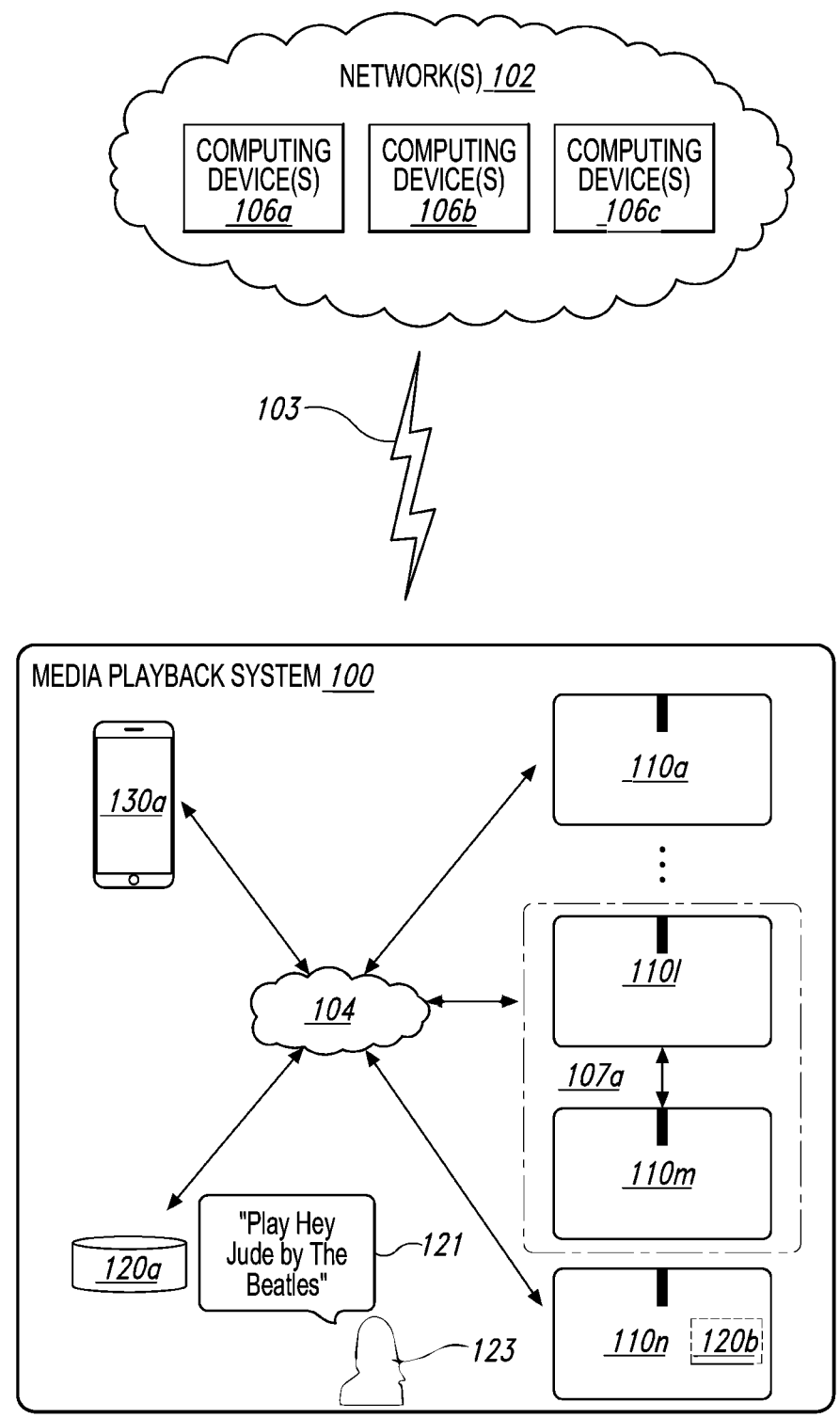
FIG. 1B is a schematic diagram of the media playback system of FIG. 1A and one or more networks.

FIG. 1B is a schematic diagram of the media playback system 100 and a cloud network 102. For ease of illustration, certain devices of the media playback system 100 and the cloud network 102 are omitted from FIG. 1B. One or more communication links 103 (referred to hereinafter as "the links 103") communicatively couple the media playback system 100 and the cloud network 102.

The links 103 can comprise, for example, one or more wired networks, one or more wireless networks, one or more wide area networks (WAN), one or more local area networks (LAN), one or more personal area networks (PAN), one or more telecommunication networks (e.g., one or more Global System for Mobiles (GSM) networks, Code Division Multiple Access (CDMA) networks, Long-Term Evolution (LTE) networks, 5G communication network networks, and/or other suitable data transmission protocol networks), etc. The cloud network 102 is configured to deliver media content (e.g., audio content, video content, photographs, social media content) to the media playback system 100 in response to a request transmitted from the media playback system 100 via the links 103. In some embodiments, the cloud network 102 is further configured to receive data (e.g. voice input data) from the media playback system 100 and correspondingly transmit commands and/or media content to the media playback system 100.

The cloud network 102 comprises computing devices 106 (identified separately as a first computing device 106a, a second computing device 106b, and a third computing device 106c). The computing devices 106 can comprise individual computers or servers, such as, for example, a media streaming service server storing audio and/or other media content, a voice service server, a social media server, a media playback system control server, etc. In some embodiments, one or more of the computing devices 106 comprise modules of a single computer or server. In certain embodiments, one or more of the computing devices 106 comprise one or more modules, computers, and/or servers. Moreover, while the cloud network 102 is described above in the context of a single cloud network, in some embodiments the cloud network 102 comprises a plurality of cloud networks comprising communicatively coupled computing devices. Furthermore, while the cloud network 102 is shown in FIG. 1B as having three of the computing devices 106, in some embodiments, the cloud network 102 comprises fewer (or more than) three computing devices 106.

The media playback system 100 is configured to receive media content from the networks 102 via the links 103. The received media content can comprise, for example, a Uniform Resource Identifier (URI) and/or a Uniform Resource Locator (URL). For instance, in some examples, the media playback system 100 can stream, download, or otherwise obtain data from a URI or a URL corresponding to the received media content. A network 104 communicatively couples the links 103 and at least a portion of the devices (e.g., one or more of the playback devices 110, NMDs 120, and/or control devices 130) of the media playback system 100. The network 104 can include, for example, a wireless network (e.g., a WiFi network, a Bluetooth, a Z-Wave network, a ZigBee, and/or other suitable wireless communication protocol network) and/or a wired network (e.g., a network comprising Ethernet, Universal Serial Bus (USB), and/or another suitable wired communication). As those of ordinary skill in the art will appreciate, as used herein, "WiFi" can refer to several different communication protocols including, for example, Institute of Electrical and Electronics Engineers (IEEE) 802.11a, 802.11b, 802.11g, 802.11n, 802.11ac, 802.11ac, 802.11ad, 802.11af, 802.11ah, 802.11ai, 802.11aj, 802.11aq, 802.11ax, 802.11ay, 802.15, etc. transmitted at 2.4 Gigahertz (GHz), 5 GHz, and/or another suitable frequency.

In some embodiments, the network 104 comprises a dedicated communication network that the media playback system 100 uses to transmit messages between individual devices and/or to transmit media content to and from media content sources (e.g., one or more of the computing devices 106). In certain embodiments, the network 104 is configured to be accessible only to devices in the media playback system 100, thereby reducing interference and competition with other household devices. In other embodiments, however, the network 104 comprises an existing household communication network (e.g., a household WiFi network). In some embodiments, the links 103 and the network 104 comprise one or more of the same networks. In some aspects, for example, the links 103 and the network 104 comprise a telecommunication network (e.g., an LTE network, a 5G network). Moreover, in some embodiments, the media playback system 100 is implemented without the network 104, and devices comprising the media playback system 100 can communicate with each other, for example, via one or more direct connections, PANs, telecommunication networks, and/or other suitable communication links.

In some embodiments, audio content sources may be regularly added or removed from the media playback system 100. In some embodiments, for example, the media playback system 100 performs an indexing of media items when one or more media content sources are updated, added to, and/or removed from the media playback system 100. The media playback system 100 can scan identifiable media items in some or all folders and/or directories accessible to the playback devices 110, and generate or update a media content database comprising metadata (e.g., title, artist, album, track length) and other associated information (e.g., URIs, URLs) for each identifiable media item found. In some embodiments, for example, the media content database is stored on one or more of the playback devices 110, network microphone devices 120, and/or control devices 130.

In the illustrated embodiment of FIG. 1B, the playback devices 110l and 110m comprise a group 107a. The playback devices 110l and 110m can be positioned in different rooms in a household and be grouped together in the group 107a on a temporary or permanent basis based on user input received at the control device 130a and/or another control device 130 in the media playback system 100. When arranged in the group 107a, the playback devices 110l and 110m can be configured to play back the same or similar audio content in synchrony from one or more audio content sources. In certain embodiments, for example, the group 107a comprises a bonded zone in which the playback devices 110l and 110m comprise left audio and right audio channels, respectively, of multi-channel audio content, thereby producing or enhancing a stereo effect of the audio content. In some embodiments, the group 107a includes additional playback devices 110. In other embodiments, however, the media playback system 100 omits the group 107a and/or other grouped arrangements of the playback devices 110.

The media playback system 100 includes the NMDs 120a and 120d, each comprising one or more microphones configured to receive voice utterances from a user. In the illustrated embodiment of FIG. 1B, the NMD 120a is a standalone device and the NMD 120d is integrated into the playback device 110n. The NMD 120a, for example, is configured to receive voice input 121 from a user 123. In some embodiments, the NMD 120a transmits data associated with the received voice input 121 to a voice assistant service (VAS) configured to (i) process the received voice input data and (ii) transmit a corresponding command to the media playback system 100. In some aspects, for example, the computing device 106c comprises one or more modules and/or servers of a VAS (e.g., a VAS operated by one or more of SONOS®, AMAZON®, GOOGLE® APPLE®, MICROSOFT®). The computing device 106c can receive the voice input data from the NMD 120a via the network 104 and the links 103. In response to receiving the voice input data, the computing device 106c processes the voice input data (i.e., "Play Hey Jude by The Beatles"), and determines that the processed voice input includes a command to play a song (e.g., "Hey Jude"). The computing device 106c accordingly transmits commands to the media playback system 100 to play back "Hey Jude" by the Beatles from a suitable media service (e.g., via one or more of the computing devices 106) on one or more of the playback devices 110.

b. Suitable Playback Devices

Figure 1C:
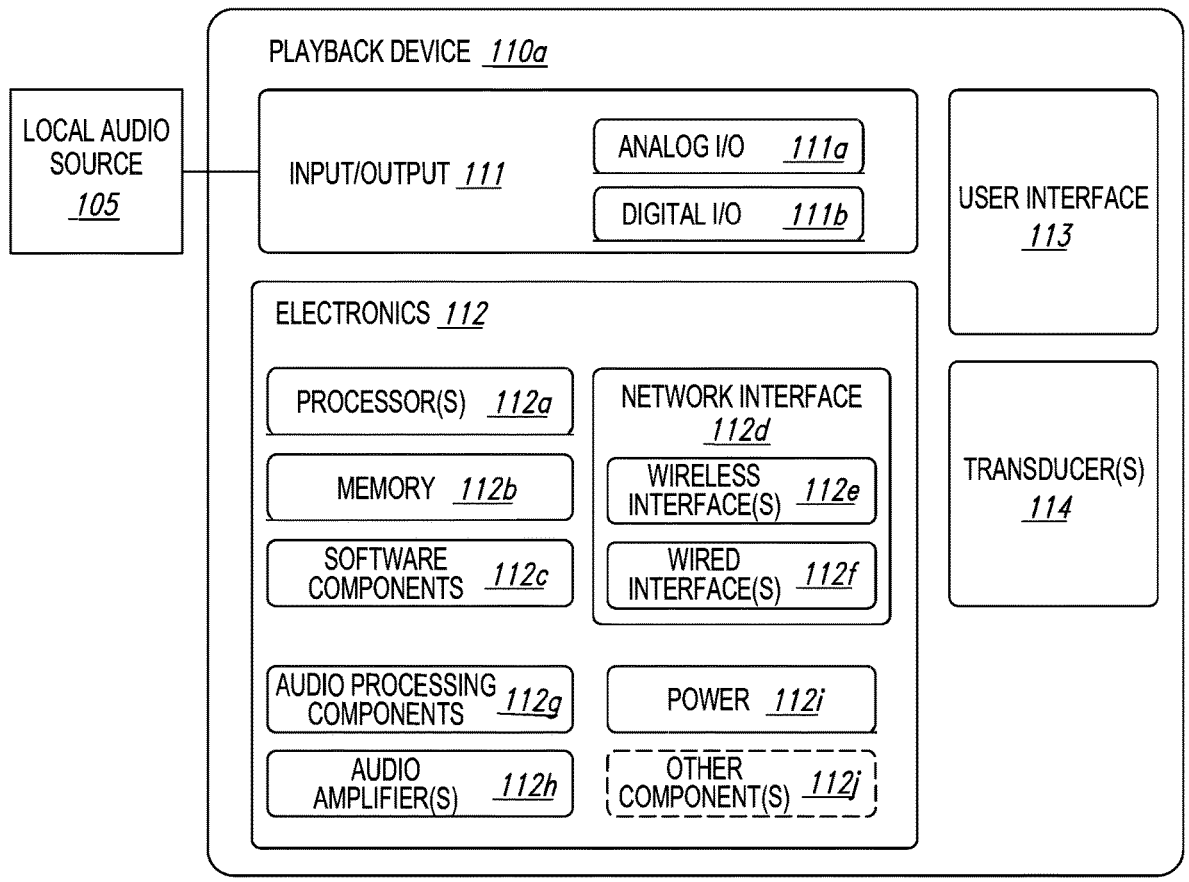
FIG. 1C is a block diagram of a playback device.

FIG. 1C is a block diagram of the playback device 110a comprising an input/output 111. The input/output 111 can include an analog I/O 111a (e.g., one or more wires, cables, and/or other suitable communication links configured to carry analog signals) and/or a digital I/O 111b (e.g., one or more wires, cables, or other suitable communication links configured to carry digital signals). In some embodiments, the analog I/O 111a is an audio line-in input connection comprising, for example, an auto-detecting 3.5 mm audio line-in connection. In some embodiments, the digital I/O 111b comprises a Sony/Philips Digital Interface Format (S/PDIF) communication interface and/or cable and/or a Toshiba Link (TOSLINK) cable. In some embodiments, the digital I/O 111b comprises a High-Definition Multimedia Interface (HDMI) interface and/or cable. In some embodiments, the digital I/O 111b includes one or more wireless communication links comprising, for example, a radio frequency (RF), infrared, WiFi, Bluetooth, or another suitable communication protocol. In certain embodiments, the analog I/O 111a and the digital 111b comprise interfaces (e.g., ports, plugs, jacks) configured to receive connectors of cables transmitting analog and digital signals, respectively, without necessarily including cables.

The playback device 110a, for example, can receive media content (e.g., audio content comprising music and/or other sounds) from a local audio source 105 via the input/output 111 (e.g., a cable, a wire, a PAN, a Bluetooth connection, an ad hoc wired or wireless communication network, and/or another suitable communication link). The local audio source 105 can comprise, for example, a mobile device (e.g., a smartphone, a tablet, a laptop computer) or another suitable audio component (e.g., a television, a desktop computer, an amplifier, a phonograph, a Blu-ray player, a memory storing digital media files). In some aspects, the local audio source 105 includes local music libraries on a smartphone, a computer, a networked-attached storage (NAS), and/or another suitable device configured to store media files. In certain embodiments, one or more of the playback devices 110, NMDs 120, and/or control devices 130 comprise the local audio source 105. In other embodiments, however, the media playback system omits the local audio source 105 altogether. In some embodiments, the playback device 110a does not include an input/output 111 and receives all audio content via the network 104.

The playback device 110a further comprises electronics 112, a user interface 113 (e.g., one or more buttons, knobs, dials, touch-sensitive surfaces, displays, touchscreens), and one or more transducers 114 (referred to hereinafter as "the transducers 114"). The electronics 112 is configured to receive audio from an audio source (e.g., the local audio source 105) via the input/output 111, one or more of the computing devices 106a-c via the network 104 (FIG. 1B)), amplify the received audio, and output the amplified audio for playback via one or more of the transducers 114. In some embodiments, the playback device 110a optionally includes one or more microphones 115 (e.g., a single microphone, a plurality of microphones, a microphone array) (hereinafter referred to as "the microphones 115"). In certain embodiments, for example, the playback device 110a having one or more of the optional microphones 115 can operate as an NMD configured to receive voice input from a user and correspondingly perform one or more operations based on the received voice input.

In the illustrated embodiment of FIG. 1C, the electronics 112 comprise one or more processors 112a (referred to hereinafter as "the processors 112a"), memory 112b, software components 112c, a network interface 112d, one or more audio processing components 112g (referred to hereinafter as "the audio components 112g"), one or more audio amplifiers 112h (referred to hereinafter as "the amplifiers 112h"), and power 112i (e.g., one or more power supplies, power cables, power receptacles, batteries, induction coils, Power-over Ethernet (POE) interfaces, and/or other suitable sources of electric power). In some embodiments, the electronics 112 optionally include one or more other components 112j (e.g., one or more sensors, video displays, touchscreens, battery charging bases).

The processors 112a can comprise clock-driven computing component(s) configured to process data, and the memory 112b can comprise a computer-readable medium (e.g., a tangible, non-transitory computer-readable medium, data storage loaded with one or more of the software components 112c) configured to store instructions for performing various operations and/or functions. The processors 112a are configured to execute the instructions stored on the memory 112b to perform one or more of the operations. The operations can include, for example, causing the playback device 110a to retrieve audio data from an audio source (e.g., one or more of the computing devices 106a-c (FIG. 1B)), and/or another one of the playback devices 110. In some embodiments, the operations further include causing the playback device 110a to send audio data to another one of the playback devices 110a and/or another device (e.g., one of the NMDs 120). Certain embodiments include operations causing the playback device 110a to pair with another of the one or more playback devices 110 to enable a multi-channel audio environment (e.g., a stereo pair, a bonded zone).

The processors 112a can be further configured to perform operations causing the playback device 110a to synchronize playback of audio content with another of the one or more playback devices 110. As those of ordinary skill in the art will appreciate, during synchronous playback of audio content on a plurality of playback devices, a listener will preferably be unable to perceive time-delay differences between playback of the audio content by the playback device 110a and the other one or more other playback devices 110. Additional details regarding audio playback synchronization among playback devices can be found, for example, in U.S. Pat. No. 8,234,395, which was incorporated by reference above.

In some embodiments, the memory 112b is further configured to store data associated with the playback device 110a, such as one or more zones and/or zone groups of which the playback device 110a is a member, audio sources accessible to the playback device 110a, and/or a playback queue that the playback device 110a (and/or another of the one or more playback devices) can be associated with. The stored data can comprise one or more state variables that are periodically updated and used to describe a state of the playback device 110a. The memory 112b can also include data associated with a state of one or more of the other devices (e.g., the playback devices 110, NMDs 120, control devices 130) of the media playback system 100. In some aspects, for example, the state data is shared during predetermined intervals of time (e.g., every 5 seconds, every 10 seconds, every 60 seconds) among at least a portion of the devices of the media playback system 100, so that one or more of the devices have the most recent data associated with the media playback system 100.

The network interface 112d is configured to facilitate a transmission of data between the playback device 110a and one or more other devices on a data network such as, for example, the links 103 and/or the network 104 (FIG. 1B). The network interface 112d is configured to transmit and receive data corresponding to media content (e.g., audio content, video content, text, photographs) and other signals (e.g., non-transitory signals) comprising digital packet data including an Internet Protocol (IP)-based source address and/or an IP-based destination address. The network interface 112d can parse the digital packet data such that the electronics 112 properly receives and processes the data destined for the playback device 110a.

In the illustrated embodiment of FIG. 1C, the network interface 112d comprises one or more wireless interfaces 112e (referred to hereinafter as "the wireless interface 112e"). The wireless interface 112e (e.g., a suitable interface comprising one or more antennae) can be configured to wirelessly communicate with one or more other devices (e.g., one or more of the other playback devices 110, NMDs 120, and/or control devices 130) that are communicatively coupled to the network 104 (FIG. 1B) in accordance with a suitable wireless communication protocol (e.g., WiFi, Bluetooth, LTE). In some embodiments, the network interface 112d optionally includes a wired interface 112f (e.g., an interface or receptacle configured to receive a network cable such as an Ethernet, a USB-A, USB-C, and/or Thunderbolt cable) configured to communicate over a wired connection with other devices in accordance with a suitable wired communication protocol. In certain embodiments, the network interface 112d includes the wired interface 112f and excludes the wireless interface 112e. In some embodiments, the electronics 112 excludes the network interface 112d altogether and transmits and receives media content and/or other data via another communication path (e.g., the input/output 111).

The audio components 112g are configured to process and/or filter data comprising media content received by the electronics 112 (e.g., via the input/output 111 and/or the network interface 112d) to produce output audio signals. In some embodiments, the audio processing components 112g comprise, for example, one or more digital-to-analog converters (DAC), audio preprocessing components, audio enhancement components, a digital signal processors (DSPs), and/or other suitable audio processing components, modules, circuits, etc. In certain embodiments, one or more of the audio processing components 112g can comprise one or more subcomponents of the processors 112a. In some embodiments, the electronics 112 omits the audio processing components 112g. In some aspects, for example, the processors 112a execute instructions stored on the memory 112b to perform audio processing operations to produce the output audio signals.

The amplifiers 112h are configured to receive and amplify the audio output signals produced by the audio processing components 112g and/or the processors 112a. The amplifiers 112h can comprise electronic devices and/or components configured to amplify audio signals to levels sufficient for driving one or more of the transducers 114. In some embodiments, for example, the amplifiers 112h include one or more switching or class-D power amplifiers. In other embodiments, however, the amplifiers include one or more other types of power amplifiers (e.g., linear gain power amplifiers, class-A amplifiers, class-B amplifiers, class-AB amplifiers, class-C amplifiers, class-D amplifiers, class-E amplifiers, class-F amplifiers, class-G and/or class H amplifiers, and/or another suitable type of power amplifier). In certain embodiments, the amplifiers 112h comprise a suitable combination of two or more of the foregoing types of power amplifiers. Moreover, in some embodiments, individual ones of the amplifiers 112h correspond to individual ones of the transducers 114. In other embodiments, however, the electronics 112 includes a single one of the amplifiers 112h configured to output amplified audio signals to a plurality of the transducers 114. In some other embodiments, the electronics 112 omits the amplifiers 112h.

The transducers 114 (e.g., one or more speakers and/or speaker drivers) receive the amplified audio signals from the amplifier 112h and render or output the amplified audio signals as sound (e.g., audible sound waves having a frequency between about 20 Hertz (Hz) and 20 kilohertz (kHz)). In some embodiments, the transducers 114 can comprise a single transducer. In other embodiments, however, the transducers 114 comprise a plurality of audio transducers. In some embodiments, the transducers 114 comprise more than one type of transducer. For example, the transducers 114 can include one or more low frequency transducers (e.g., subwoofers, woofers), mid-range frequency transducers (e.g., mid-range transducers, mid-woofers), and one or more high frequency transducers (e.g., one or more tweeters). As used herein, "low frequency" can generally refer to audible frequencies below about 500 Hz, "mid-range frequency" can generally refer to audible frequencies between about 500 Hz and about 2 kHz, and "high frequency" can generally refer to audible frequencies above 2 kHz. In certain embodiments, however, one or more of the transducers 114 comprise transducers that do not adhere to the foregoing frequency ranges. For example, one of the transducers 114 may comprise a mid-woofer transducer configured to output sound at frequencies between about 200 Hz and about 5 kHz.

Figure 1D:
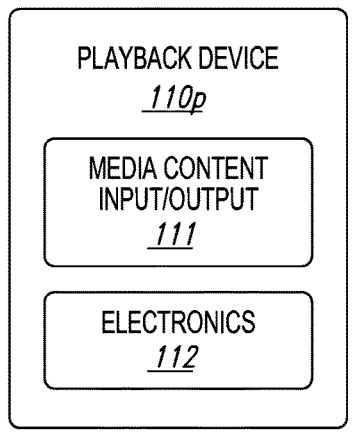
FIG. 1D is a block diagram of a playback device.

By way of illustration, SONOS, Inc. presently offers (or has offered) for sale certain playback devices including, for example, a "SONOS ONE," "PLAY:1," "PLAY:3," "PLAY:5," "PLAYBAR," "PLAYBASE," "CONNECT:AMP," "CONNECT," and "SUB." Other suitable playback devices may additionally or alternatively be used to implement the playback devices of example embodiments disclosed herein. Additionally, one of ordinary skilled in the art will appreciate that a playback device is not limited to the examples described herein or to SONOS product offerings. In some embodiments, for example, one or more playback devices 110 comprises wired or wireless headphones (e.g., over-the-ear headphones, on-ear headphones, in-ear earphones). In other embodiments, one or more of the playback devices 110 comprise a docking station and/or an interface configured to interact with a docking station for personal mobile media playback devices. In certain embodiments, a playback device may be integral to another device or component such as a television, a lighting fixture, or some other device for indoor or outdoor use. In some embodiments, a playback device omits a user interface and/or one or more transducers. For example, FIG. 1D is a block diagram of a playback device 110p comprising the input/output 111 and electronics 112 without the user interface 113 or transducers 114.

Figure 1E:
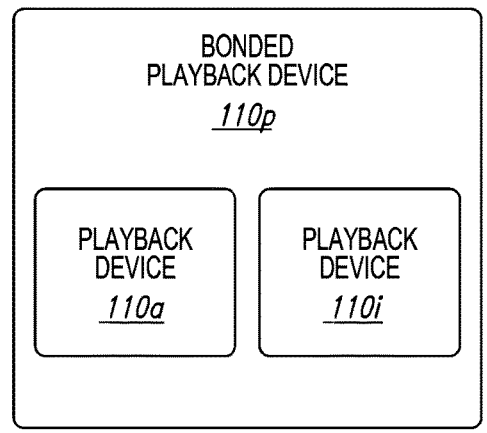
FIG. 1E is a block diagram of a network microphone device.

FIG. 1E is a block diagram of a bonded playback device 110q comprising the playback device 110a (FIG. 1C) sonically bonded with the playback device 110i (e.g., a subwoofer) (FIG. 1A). In the illustrated embodiment, the playback devices 110a and 110i are separate ones of the playback devices 110 housed in separate enclosures. In some embodiments, however, the bonded playback device 110q comprises a single enclosure housing both the playback devices 110a and 110i. The bonded playback device 110q can be configured to process and reproduce sound differently than an unbonded playback device (e.g., the playback device 110a of FIG. 1C) and/or paired or bonded playback devices (e.g., the playback devices 110l and 110m of FIG. 1B). In some embodiments, for example, the playback device 110a is full-range playback device configured to render low frequency, mid-range frequency, and high frequency audio content, and the playback device 110i is a subwoofer configured to render low frequency audio content. In some aspects, the playback device 110a, when bonded with the first playback device, is configured to render only the mid-range and high frequency components of a particular audio content, while the playback device 110i renders the low frequency component of the particular audio content. In some embodiments, the bonded playback device 110q includes additional playback devices and/or another bonded playback device.

c. Suitable Network Microphone Devices (NMDs)

FIG. 1F is a block diagram of the NMD 120a (FIGS. 1A and 1B). The NMD 120a includes one or more voice processing components 124 (hereinafter "the voice components 124") and several components described with respect to the playback device 110a (FIG. 1C) including the processors 112a, the memory 112b, and the microphones 115. The NMD 120a optionally comprises other components also included in the playback device 110a (FIG. 1C), such as the user interface 113 and/or the transducers 114. In some embodiments, the NMD 120a is configured as a media playback device (e.g., one or more of the playback devices 110), and further includes, for example, one or more of the audio components 112g (FIG. 1C), the amplifiers 114, and/or other playback device components. In certain embodiments, the NMD 120a comprises an Internet of Things (IoT) device such as, for example, a thermostat, alarm panel, fire and/or smoke detector, etc. In some embodiments, the NMD 120a comprises the microphones 115, the voice processing 124, and only a portion of the components of the electronics 112 described above with respect to FIG. 1B. In some aspects, for example, the NMD 120a includes the processor 112a and the memory 112b (FIG. 1B), while omitting one or more other components of the electronics 112. In some embodiments, the NMD 120a includes additional components (e.g., one or more sensors, cameras, thermometers, barometers, hygrometers).

In some embodiments, an NMD can be integrated into a playback device. FIG. 1G is a block diagram of a playback device 110r comprising an NMD 120d. The playback device 110r can comprise many or all of the components of the playback device 110a and further include the microphones 115 and voice processing 124 (FIG. 1F). The playback device 110r optionally includes an integrated control device 130c. The control device 130c can comprise, for example, a user interface (e.g., the user interface 113 of FIG. 1B) configured to receive user input (e.g., touch input, voice input) without a separate control device. In other embodiments, however, the playback device 110r receives commands from another control device (e.g., the control device 130a of FIG. 1B).

Referring again to FIG. 1F, the microphones 115 are configured to acquire, capture, and/or receive sound from an environment (e.g., the environment 101 of FIG. 1A) and/or a room in which the NMD 120a is positioned. The received sound can include, for example, vocal utterances, audio played back by the NMD 120a and/or another playback device, background voices, ambient sounds, etc. The microphones 115 convert the received sound into electrical signals to produce microphone data. The voice processing 124 receives and analyzes the microphone data to determine whether a voice input is present in the microphone data. The voice input can comprise, for example, an activation word followed by an utterance including a user request. As those of ordinary skill in the art will appreciate, an activation word is a word or other audio cue that signifying a user voice input. For instance, in querying the AMAZON® VAS, a user might speak the activation word "Alexa." Other examples include "Ok, Google" for invoking the GOOGLE® VAS and "Hey, Siri" for invoking the APPLE® VAS.

After detecting the activation word, voice processing 124 monitors the microphone data for an accompanying user request in the voice input. The user request may include, for example, a command to control a third-party device, such as a thermostat (e.g., NEST® thermostat), an illumination device (e.g., a PHILIPS HUE® lighting device), or a media playback device (e.g., a Sonos® playback device). For example, a user might speak the activation word "Alexa" followed by the utterance "set the thermostat to 68 degrees" to set a temperature in a home (e.g., the environment 101 of FIG. 1A). The user might speak the same activation word followed by the utterance "turn on the living room" to turn on illumination devices in a living room area of the home. The user may similarly speak an activation word followed by a request to play a particular song, an album, or a playlist of music on a playback device in the home.

d. Suitable Control Devices

FIG. 1H is a partially schematic diagram of the control device 130a (FIGS. 1A and 1B). As used herein, the term "control device" can be used interchangeably with "controller" or "control system." Among other features, the control device 130a is configured to receive user input related to the media playback system 100 and, in response, cause one or more devices in the media playback system 100 to perform an action(s) or operation(s) corresponding to the user input. In the illustrated embodiment, the control device 130a comprises a smartphone (e.g., an iPhone™, an Android phone) on which media playback system controller application software is installed. In some embodiments, the control device 130a comprises, for example, a tablet (e.g., an iPad™), a computer (e.g., a laptop computer, a desktop computer), and/or another suitable device (e.g., a television, an automobile audio head unit, an IoT device). In certain embodiments, the control device 130a comprises a dedicated controller for the media playback system 100. In other embodiments, as described above with respect to FIG. 1G, the control device 130a is integrated into another device in the media playback system 100 (e.g., one more of the playback devices 110, NMDs 120, and/or other suitable devices configured to communicate over a network).

The control device 130a includes electronics 132, a user interface 133, one or more speakers 134, and one or more microphones 135. The electronics 132 comprise one or more processors 132a (referred to hereinafter as "the processors 132a"), a memory 132b, software components 132c, and a network interface 132d. The processor 132a can be configured to perform functions relevant to facilitating user access, control, and configuration of the media playback system 100. The memory 132b can comprise data storage that can be loaded with one or more of the software components executable by the processor 302 to perform those functions. The software components 132c can comprise applications and/or other executable software configured to facilitate control of the media playback system 100. The memory 112b can be configured to store, for example, the software components 132c, media playback system controller application software, and/or other data associated with the media playback system 100 and the user.

The network interface 132d is configured to facilitate network communications between the control device 130a and one or more other devices in the media playback system 100, and/or one or more remote devices. In some embodiments, the network interface 132 is configured to operate according to one or more suitable communication industry standards (e.g., infrared, radio, wired standards including IEEE 802.3, wireless standards including IEEE 802.11a, 802.11b, 802.11g, 802.11n, 802.11ac, 802.15, 4G, LTE). The network interface 132d can be configured, for example, to transmit data to and/or receive data from the playback devices 110, the NMDs 120, other ones of the control devices 130, one of the computing devices 106 of FIG. 1B, devices comprising one or more other media playback systems, etc. The transmitted and/or received data can include, for example, playback device control commands, state variables, playback zone and/or zone group configurations. For instance, based on user input received at the user interface 133, the network interface 132d can transmit a playback device control command (e.g., volume control, audio playback control, audio content selection) from the control device 304 to one or more of the playback devices 100. The network interface 132d can also transmit and/or receive configuration changes such as, for example, adding/removing one or more playback devices 100 to/from a zone, adding/removing one or more zones to/from a zone group, forming a bonded or consolidated player, separating one or more playback devices from a bonded or consolidated player, among others.

The user interface 133 is configured to receive user input and can facilitate 'control of the media playback system 100. The user interface 133 includes media content art 133a (e.g., album art, lyrics, videos), a playback status indicator 133b (e.g., an elapsed and/or remaining time indicator), media content information region 133c, a playback control region 133d, and a zone indicator 133e. The media content information region 133c can include a display of relevant information (e.g., title, artist, album, genre, release year) about media content currently playing and/or media content in a queue or playlist. The playback control region 133d can include selectable (e.g., via touch input and/or via a cursor or another suitable selector) icons to cause one or more playback devices in a selected playback zone or zone group to perform playback actions such as, for example, play or pause, fast forward, rewind, skip to next, skip to previous, enter/exit shuffle mode, enter/exit repeat mode, enter/exit cross fade mode, etc. The playback control region 133d may also include selectable icons to modify equalization settings, playback volume, and/or other suitable playback actions. In the illustrated embodiment, the user interface 133 comprises a display presented on a touch screen interface of a smartphone (e.g., an iPhone™, an Android phone). In some embodiments, however, user interfaces of varying formats, styles, and interactive sequences may alternatively be implemented on one or more network devices to provide comparable control access to a media playback system.

The one or more speakers 134 (e.g., one or more transducers) can be configured to output sound to the user of the control device 130a. In some embodiments, the one or more speakers comprise individual transducers configured to correspondingly output low frequencies, mid-range frequencies, and/or high frequencies. In some aspects, for example, the control device 130a is configured as a playback device (e.g., one of the playback devices 110). Similarly, in some embodiments the control device 130a is configured as an NMD (e.g., one of the NMDs 120), receiving voice commands and other sounds via the one or more microphones 135.

The one or more microphones 135 can comprise, for example, one or more condenser microphones, electret condenser microphones, dynamic microphones, and/or other suitable types of microphones or transducers. In some embodiments, two or more of the microphones 135 are arranged to capture location information of an audio source (e.g., voice, audible sound) and/or configured to facilitate filtering of background noise. Moreover, in certain embodiments, the control device 130a is configured to operate as playback device and an NMD. In other embodiments, however, the control device 130a omits the one or more speakers 134 and/or the one or more microphones 135. For instance, the control device 130a may comprise a device (e.g., a thermostat, an IoT device, a network device) comprising a portion of the electronics 132 and the user interface 133 (e.g., a touch screen) without any speakers or microphones.

III. Examples of Propagating Network Configuration Parameters

Figure 2A:
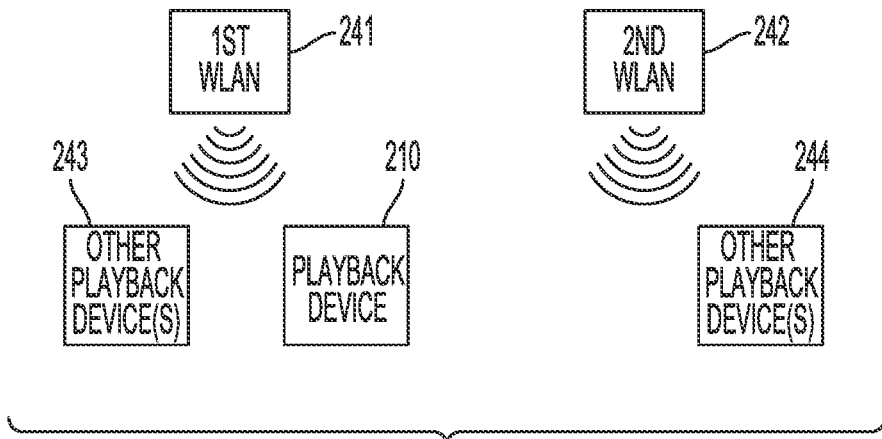
FIG. 2A is a schematic diagram of a playback device connected to a first WLAN.
Figure 2B:
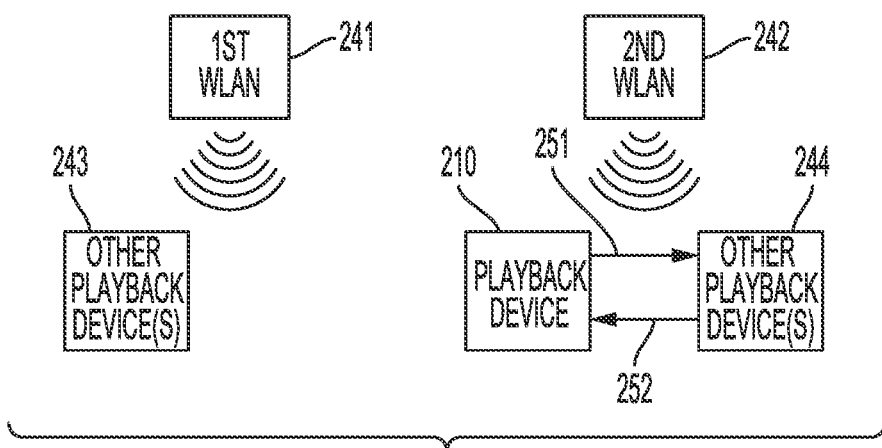
FIG. 2B is a schematic diagram of the playback device shown in FIG. 2A connected to a second WLAN.
Figure 2C:
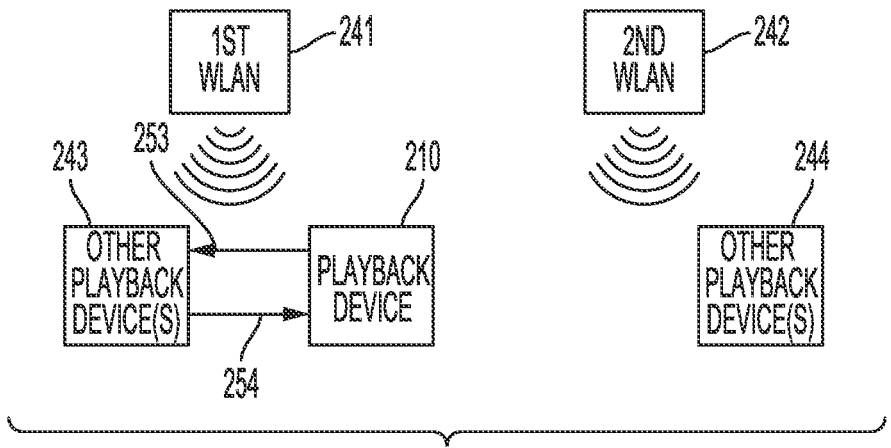
FIG. 2C is a schematic diagram of the playback device shown in FIGS. 2A and 2B reconnected to the first WLAN.

Turning now to FIGS. 2A-2C, schematic diagrams are shown of a playback device that moves between connections to a first WLAN and a second WLAN. The playback device 210 shown in FIGS. 2A-2C may be, for example, one of the playback devices 110 discussed in the examples above. Further, the first WLAN 241 may represent a network 104 as described above with respect to FIG. 1B, such as a WiFi network, that facilitates the operation of the networked media playback system 100 shown in FIG. 1A. Accordingly, the first WLAN 241 may be referred to as a listener's "home" WLAN in some of the examples that follow. Similarly, the other playback device(s) 243 depicted in FIGS. 2A-2C may represent one or more of the other playback devices 110 included in the media playback system 100 shown in FIG. 1A.

The second WLAN 242 shown in FIGS. 2A-2C may represent another WLAN to which the listener might connect her playback devices, such as an "office" WLAN located at the listener's workplace. Further, the listener might normally keep one or more other playback devices 244 connected to the second WLAN 242, which she may use for listening to audio content while at work.

In this example, the listener moves the playback device 210 between two different environments having different WLANs with different SSIDs. In each respective environment, the playback device 210 can communicate with any other playback device(s) that are also connected to the given WLAN and registered to the listener's user account. For example, the listener's user account may include information regarding the listener's listening preferences, streaming media content subscriptions, among other things.

As shown in FIG. 2A, the playback device 210 may connect to the first WLAN 241, which involves the playback device 210 receiving a first set of configuration parameters for the first WLAN. The first set of configuration parameters includes an identifier of the first WLAN 241 and a first security parameter for the first WLAN. The identifier may be a network SSID and the security parameter may be a network key or password, as noted above. Other examples exist, including network configuration parameters that include different types of network identifiers and/or security parameters, or perhaps no security parameter at all.

For example, the listener may provide an input via a computing device that is running an application for controlling the networked media playback system 100, such as the listener's smartphone. The input may indicate a command to set up a new playback device for operation as part of the networked media playback system 100. The application may then guide the user through the setup process, which might involve the user identifying or selecting the playback device 210 on a graphical user interface of the computing device, and/or interacting with the playback device 210 by pressing a button on the playback device 210, for example, after which the computing device may provide the playback device 210 with the first set of network configuration parameters for connecting to the first WLAN 241. The example setup process just described represents one possibility and might include more or fewer steps in other implementations.

After connecting to the first WLAN 241, the playback device 210 may store the first set of network configuration parameters. For instance, the playback device 210 may store the first set of network configuration parameters in memory 112*b*, as shown in FIG. 1C. Further, one or more other playback device(s) 243 are also connected to the first WLAN, enabling all of the playback devices connected to the first WLAN to operate together as part of the networked media playback system 100, as discussed above.

The listener may then decide to take the playback device 210 from her home to her office, as shown schematically in FIG. 2B. Thus, the playback device 210 disconnects from the first WLAN 241. The playback device 210 then receives a second set of network configuration parameters including an identifier of the second WLAN 242 and a second security parameter for the second WLAN 242. For example, the playback device 210 may receive the second set of network configuration parameters via a setup process for connecting to the second WLAN 242 that resembles the setup process discussed above, facilitated by the listener's smartphone. The playback device 210 may then communicate and operate in synchrony with the other playback device(s) 244 that the listener normally keeps at her office.

The playback device 210 may store the second set of network configuration parameters. For instance, the playback device 210 may store the second set of network configuration parameters in memory 112*b*, as discussed above. However, unlike some conventional playback devices, the playback device 210 does not overwrite or delete the first set of network configuration parameters. Rather, the playback device 210 now maintains both sets of network configuration parameters in memory 112*b*.

For example, the playback device 210 may store a network list that includes sets of network configuration parameters that the playback device 210 has received. Thus, when the playback device 210 receives the second set of network configuration parameters for connecting to the second WLAN 242, the playback device 210 may update its network list that includes the first set of network configuration parameters to include the second set of network configuration parameters.

Additionally, after connecting to the second WLAN 242, the playback device 210 may exchange information regarding its stored network configuration parameters with the other playback device(s) 244 that were already connected to the second WLAN 242. For example, the playback device 210 may transmit, absent user request, the first set of network configuration parameters to at least one other playback device that is connected to the second WLAN for storage on the at least one other playback device that is connected to the second WLAN, as shown at 251 in FIG. 2B. In this way, each of the other playback device(s) 244 may receive and store the first network configuration parameters, e.g., by updating their own respective network lists. Thus, even though the other playback device(s) 244 have never undergone the setup process for connecting to the first WLAN 241, they are now nonetheless equipped to connect to the first WLAN 241 if the listener ever decides to take one of them home from her workplace.

Further, one or more of the other playback device(s) 244 may also transmit their own respective network lists to the playback device 210, as shown at 252 in FIG. 2B. In some embodiments, each of these lists may include only the second set of network configuration parameters for the second WLAN 244, which the playback device 210 may already have stored in memory. Thus, the playback device 210 might not update its own network list based on the data transmitted from the other playback device(s) 244 at 252.

The exchange and update of stored network configuration parameters noted above may occur automatically after the playback device 210 is connected to the second WLAN 242. For example, the playback device 210 may be configured to, after connecting to the second WLAN 242 and without user input, transmit its network list to each of the other playback device(s) 244 that is connected to the second WLAN 242.

In some embodiments, the exchange and update of stored network configuration parameters may be a two-way exchange because in some cases, the other playback device(s) 244 that are connected to the second WLAN 244 may have stored in memory more than the second set of network configuration parameters. For instance, in the example discussed above, the listener may have previously taken one of the other playback device(s) 244 to a co-worker's house and connected it to a third WLAN there, upon which it stored the third set of network configuration parameters in memory. When the listener then returned the playback device to her workplace, it reconnected to the second WLAN 244 using the stored second set of network configuration parameters. In addition, and following a similar process to that discussed above, the third set of network configuration parameters was then propagated to and stored in memory by each of the other playback device(s) 244.

In some situations, the listener's co-worker might have one or more of his own "home" playback devices that are connected to the third WLAN and registered to his user account, but not the listener's user account. Thus, the co-worker's home playback devices might not be discoverable to the listener's visiting playback device, even after it connects to the third WLAN, and vice versa. However, in some implementations, the listener and her co-worker may be able to link their user accounts such that their respective playback devices are mutually discoverable and may communicate with each other for synchronous playback of media when connected to the same WLAN. For example, linking user accounts in this way may be facilitated via a control application running on one or both of the listener's and her co-worker's smartphones. Other possibilities also exist.

Accordingly, and returning to FIG. 2B, after the playback device 210 connects to the second WLAN 244, it may receive, from at least one of the other playback device(s) 244 that is connected to the second WLAN 244, the third set of network configuration parameters, as shown at 252. The third set of network configuration parameters may include an identifier of the third WLAN and a third security parameter for the third WLAN. The playback device 210 may then store the third set of network configuration parameters, e.g., by updating its network list.

In some embodiments, a given playback device from the other playback device(s) 244 may be designated to exchange network lists with the playback device 210, after the playback device 210 connects to the second WLAN 242. In some other implementations, each playback device that is connected to the second WLAN 242, including the playback device 210 and each of the other playback device(s) 244, may subscribe to the network list of each other connected playback device.

After exchanging network lists, one or more of the playback device 210 and the other playback device(s) 244 may determine the contents of the updated network list that will be distributed to each device that is connected to the second WLAN 244. For instance, in the example discussed above, each playback device that is connected to the second WLAN 244 may independently determine that its updated network list should include the first, second, and third sets of network configuration parameters. In this way, each playback device that is connected to the second WLAN 244 shown in FIG. 2B may now be configured to connect to any of the three WLANs discussed above. Numerous other examples for the exchange and update of network configuration parameters among a given group of connected playback devices are also possible.

Turning now to FIG. 2C, the playback device 210 may reconnect to the first WLAN 241 using the stored first set of network configuration parameters. For example, the listener may take the playback device 210 back home and reconnect it to her home network. As noted above, the playback device 210 now has the second set of network configuration parameters stored in memory as part of its updated network list. Thus, after reconnecting to the first WLAN 241, the playback device 210 may transmit at 253, absent user request, the second set of network configuration parameters to the other playback device(s) 243 that are connected to the first WLAN 241 for storage on the other playback device(s) 243 that are connected to the first WLAN 241. For instance, transmitting the second set of network configuration parameters may include transmitting the updated network list. Further, the playback device 210 may receive at 254, from the other playback device(s) 243, their respective network list(s) as discussed previously.

As noted above, the updated network list of the playback device 210 may also include the third set of network configuration parameters. Thus, the playback device 210 may also transmit at 253, absent user request, the third set of network configuration parameters to the other playback device(s) 243. In this way, each of the other playback device(s) 243 that is connected to the first WLAN 241 is now configured to seamlessly connect to both the second WLAN 242 at the listener's workplace and the third WLAN at her co-worker's house, if or when any of the other playback device(s) 243 are within range of the second WLAN 242 or third WLAN. Further, any additional playback devices that the listener connects to the first WLAN 241 will obtain the network configuration parameters for these other networks as well.

Although the examples above have generally discussed physically moving the playback device 210 between a first and second WLAN at different locations, this is not necessarily required to obtain the benefits described herein. For instance, in some implementations, the first WLAN may be defined by an access point operating in a first frequency band, such as a 2.4 GHz band. The second WLAN may also be defined by the same access point operating in a second frequency band that is different from the first frequency band, such as a 5.0 GHz band.

As another example, the listener might establish multiple SSIDs within her home in order to provide WiFi access for guests that is separate from her own home network on the first WLAN 241. For instance, the listener may establish a "Guest" network at her home that has a distinct SSID from, and does not communicate with, the first WLAN 241. Accordingly, the listener's playback devices may store the network configuration parameters for both networks, allowing the listener to shift a given playback device's connection back and forth as necessary between the two. For example, by shifting the playback device 210 from being connected to the first WLAN 241 to being connected to the Guest WLAN, the listener can make the playback device 210 discoverable to a visitor's computing device (e.g., a smartphone) that is connected to the Guest WLAN. In this way, the listener can selectively allow visitors to control some media playback functions on certain playback devices in the listener's home without providing the guests with access to the first WLAN 241.

Figure 3:
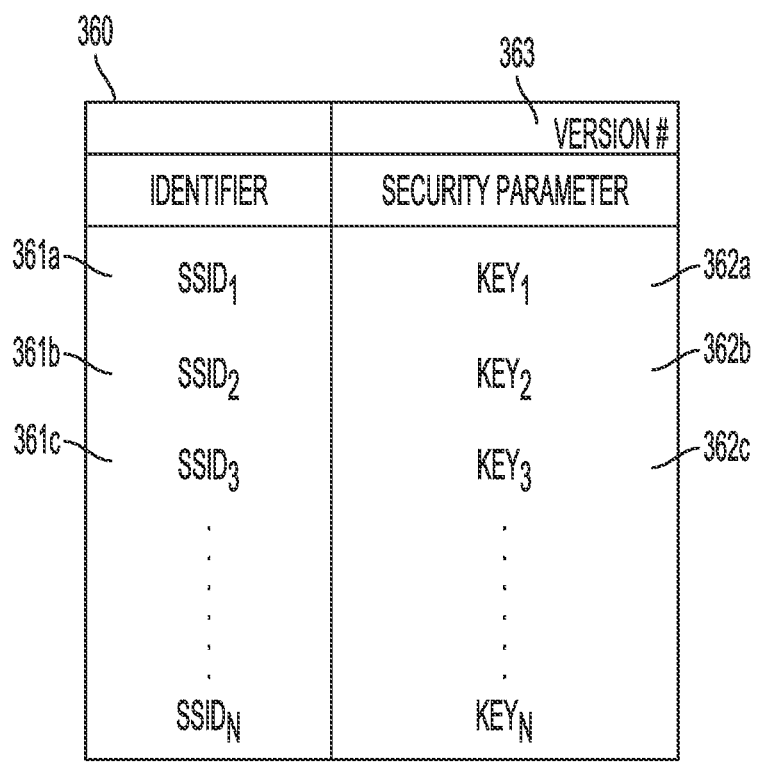

Turning now to FIG. 3, an example list of stored network configuration parameters is shown. The network list 360 includes a first column including a network identifier, shown by way of example as an SSID, and a second column including a corresponding network security parameter, shown by way of example as a network key. Thus, the network configuration parameters for the three WLANs discussed above may be stored as a first pair of network parameters, 361a, 362a, a second pair of parameters 361b, 362b, a third pair of parameters, 361c, 362c, and so on.

In some implementations, the number of different WLANs for which network configuration parameters can be added to the network list 360 might be limited, due to memory constraints of a given playback device, among other possible factors. For example, the network list 360 may be limited to 16 unique WLANs. Moreover, the listener may want to delete or update information for a stored WLAN on the network list 360 manually, via a control application on a computing device, such as a smartphone.

Accordingly, the network list 360 may include additional information that facilitates the identification of network configuration parameters that are unlikely to be needed again, and may therefore be deleted. For example, for each pair of network parameters representing a given WLAN, the network list 360 may also include a timestamp that indicates when the WLAN was first added to the network list 360. Additionally or alternatively, the network list 360 may include a timestamp that indicates the date and time at which each WLAN was last known to be in use, at least from the perspective of the playback device storing the network list 360.

For example, with reference to FIG. 2C discussed above, the playback device 210 may store in memory the network list 360 including network configuration parameters for the first, second and third WLANs mentioned in the example above. The network list 360 may also include a timestamp corresponding to the second WLAN 242 that identifies the date and time that the playback device 210 disconnected from the second WLAN 242. Thus, the timestamp may represent, from the perspective of the playback device 210, the time that the second WLAN was last known to be in use. Further, each of the other playback device(s) 243 stores the same network list 360 including the same timestamp.

If the playback device 210 reconnects to the second WLAN 242 at a later time, the timestamp corresponding to the second WLAN 242 may be updated accordingly. If the playback device 210 again returns to the first WLAN 241, the network list of each of the other playback device(s) 243 will be similarly updated.

The network list 360 shown in FIG. 3 may also include a version number 363. The version number might be, for example, a numerical counter that is incremented each time the network list is updated. Additionally or alternatively, the version number may incorporate elements of a timestamp, including an indication of the date and time that the version number was updated. Other data may be embedded in the version number 363 as well, including an indication of which WLAN in the network list 360 the playback device was connected to when the network list 360 was last updated. For instance, the version number 363 of the network list 360 shown in FIG. 3 might be 2019.08.01.0002. The first 8 digits might indicate the date (i.e., Aug. 1, 2019) on which the network list 363 was last updated, and the last four digits might indicate which WLAN from the network list 360 (i.e., the second WLAN) the playback device was connected to when the network list 363 was last updated. These and other indications may be used to resolve conflicts between network lists, as discussed below. Numerous other examples are possible for the version number 363, including syntaxes and other indications related to each WLAN that is identified in the network list 360.

In some implementations, it may be desirable to merge the network lists when a new playback device is connected to a given WLAN. For instance, in the example discussed above with respect to FIG. 2B, the playback device 210 initially connects to the second WLAN 242 with a network list that includes only the first set of network configuration parameters, corresponding to the first WLAN. Further, the other playback device(s) 244 each include a network list that includes only the second and third sets of network configuration parameters, corresponding to the second WLAN 242 and the third WLAN. In this case, it would not be desirable for either list to supersede the other. Thus, it may be desirable to merge both network lists to create an updated network list including all unique entries.

However, in some cases this may not be possible. For example, the network list of a given playback device that connects to a given WLAN may not have the capacity to include all unique entries that exist in its own network list, as well as the network list of the other playback device(s) already on the given WLAN. Thus, one or more of the playback devices may arbitrate between the network lists to determine which supersedes the other.

For instance, in the example shown above in FIG. 2C, the playback device 210 may have stored in memory a first network list before it reconnects to the first WLAN 241, such as the network list 360 shown in FIG. 3. After reconnecting to the first WLAN 241 using the stored first set of network configuration parameters, the playback device 210 may receive at 254, from the other playback device(s) 243 that are connected to the first WLAN 241, a second network list. The playback device 210 may then determine that the first network list supersedes the second network list. For example, the playback device 210 may determine that the version number of the first network list supersedes a version number of the second network list based on a more recent timestamp that is represented in the version number, for instance. The playback device 210, along with the other playback device(s) 241 that make the same determination, may then store the first network list in memory. Other possibilities also exist.

In some other examples, the playback device 210 may resolve conflicts where there are too many unique WLANs to merge into a single network list by identifying individual WLANs for which the network configuration parameters may be deleted from the first or second network list. For instance, the listener may replace the access point in her home and subsequently set up each of the playback device 210 and the other playback device(s) 243 to connect to the "new" WLAN provided by the new access point. However, the "old" WLAN from the previous access point may persist in the network list of each playback device, assuming the listener does not delete it manually.

Thereafter, the playback device 210 may identify the old WLAN for deletion from the network list. For example, the playback device 210 may identify the old WLAN based on an associated timestamp in the network list, which may indicate that the old WLAN has not been in use by any connected playback device for some time. Other examples and criteria for identifying WLANs from a network list for deletion are also possible.

Figure 4:
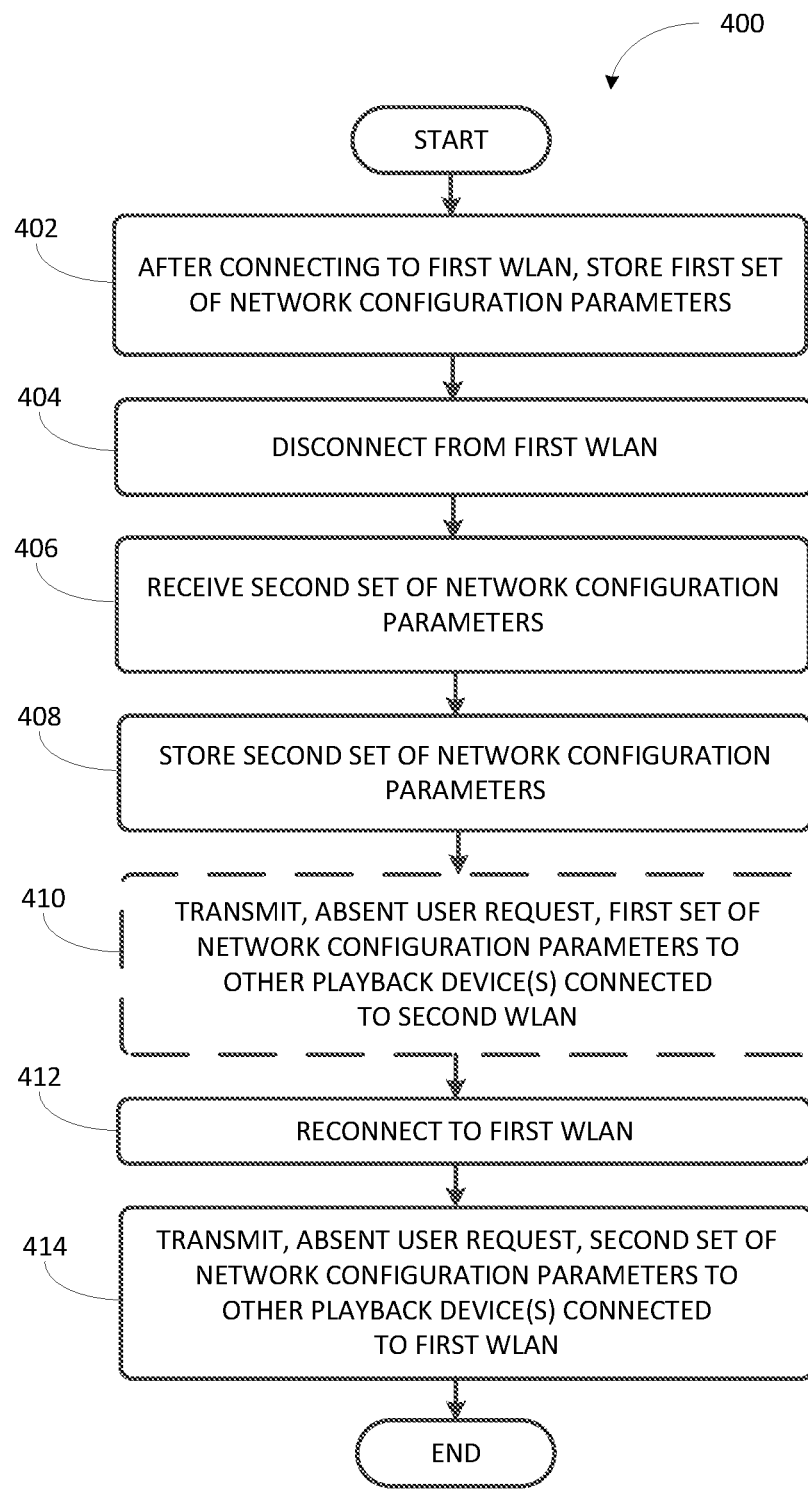
FIG. 4 is a flowchart of an example method for propagating network configuration parameters.

FIG. 4 is a flowchart of an example method 400 for propagating network configuration parameters among a plurality of playback devices. The method 400 may be carried out by one or more of the playback devices shown in FIGS. 1-3 and discussed above.

At block 402, after connecting to a first WLAN, such as the first WLAN 241 shown in FIGS. 2A-2C, a playback device, such as the playback device 210, stores a first set of network configuration parameters including an identifier of the first WLAN and a first security parameter for the first WLAN. Further, at least one other device is connected to the first WLAN 241, such as the other device(s) 243.

At block 404, the playback device 210 disconnects from the first WLAN 241. Then, at block 406, the playback device 210 receives a second set of network configuration parameters including an identifier of a second WLAN 242 and a second security parameter for the second WLAN 242. For example, the playback device 210 may connect to the second WLAN 242, as discussed above.

At block 408, the playback device 210 stores the second set of network configuration parameters. In some implementations, if other playback device(s) 244 are also be connected to the second WLAN 242, the playback device 210 may, transmit at block 410, absent user request, the first set of network configuration parameters to the other playback device(s) 244, which may take the form of a network list, such as the network list 360 shown in FIG. 3. Further, this transmittal is shown by the arrow 251 shown in FIG. 2B. Similarly, the playback device 210 may receive one or more network list(s) from the other playback device(s) 244, as shown by the arrow 252.

At block 412, after storing the second set of network configuration parameters, the playback device 210 reconnects to the first WLAN 241 using the stored first set of network configuration parameters.

At block 414, after reconnecting to the first WLAN 241, the playback device 210 transmits, absent user request, the second set of network configuration parameters to the other playback device(s) 243 that are connected to the first WLAN 241 for storage on the other playback device(s) 243 that are connected to the first WLAN 241. This transmittal, which may take the form of a network list, is shown by the line 253 in FIG. 2C. Similarly, the playback device 210 may receive one or more network list(s) from the other playback device(s) 243, as shown by the arrow 254 and discussed above.

FIG. 4 includes one or more operations, functions, or actions as illustrated by one or more of blocks 402-414. Although the blocks are illustrated in sequential order, some of the blocks may also be performed in parallel, and/or in a different order than those described herein. Also, the various blocks may be combined into fewer blocks, divided into additional blocks, and/or removed based upon the desired implementation.

In addition, for the message flow diagram in FIG. 4 and other processes and methods disclosed herein, the diagrams show functionality and operation of one possible implementation of present embodiments. In this regard, each block may represent a module, a segment, or a portion of program code, which includes one or more instructions executable by one or more processors for implementing logical functions or blocks in the process.

The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long-term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the processes and methods disclosed herein, each block in FIG. 4 may represent circuitry and/or machinery that is wired or arranged to perform the specific functions in the process.

IV. Conclusion

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only ways) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the foregoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A playback device comprising:
   at least one processor;
   at least one non-transitory computer-readable medium; and
   program instructions stored on the at least one non-transitory computer-readable medium that, when executed by the at least one processor, cause the playback device to:
   connect to a first network device via a first wireless communication link using a first set of configuration parameters for connecting to the first network device;
   store the first set of configuration parameters;
   before disconnecting from the first network device and prior to causing the playback device to join a networked playback system associated with a second network device:
   receive, from the first network device, audio content for playback;
   play back the received audio content;
   automatically receive, from the first network device, information for joining the networked playback system, the information comprising a second set of configuration parameters for connecting to the second network device associated with the networked playback system, the second set of configuration parameters being different from the first set of configuration parameters; and add the second set of configuration parameters to a
network list stored by the playback device;
disconnect from the first network device; and
while the playback device is positioned within range to
wirelessly connect to the second network device:
automatically connect to the second network device
via a second wireless communication link using
the second set of configuration parameters for
connecting to the second network device; and
in response to automatically connecting to the second network device, automatically join the networked playback system among one or more other
playback devices that are members of the networked playback system.

2. The playback device of claim 1, wherein the audio content for playback is first audio content for playback, the playback device further comprising program instructions that, when executed by the at least one processor, cause the playback device to:
after disconnecting from the first network device and while connected to the second network device, receive, from the second network device, second audio content for playback; and
play back the received second audio content.

3. The playback device of claim 2, wherein the program instructions that, when executed by the at least one processor, cause the playback device to receive, from the first network device, the first audio content for playback comprise program instructions that, when executed by the at least one processor, cause the playback device to receive, from the first network device, streaming media content received by the first network device from a cloud based computing system associated with a streaming media service.

4. The playback device of claim 3, wherein the program instructions that, when executed by the at least one processor, cause the playback device to receive, from the second network device, the second audio content for playback comprise program instructions that, when executed by the at least one processor, cause the playback device to:
receive, from a computing device that is also connected to the second network device, one or more media item identifiers; and
utilize the one or more media item identifiers to retrieve, from a cloud based computing system associated with a streaming media service, the second audio content for playback.

5. The playback device of claim 4, wherein the computing device is the first network device.

6. The playback device of claim 3, wherein:
the program instructions that, when executed by the at least one processor, cause the playback device to receive, from the second network device, the second audio content for playback comprise program instructions that, when executed by the at least one processor, cause the playback device to receive, from at least one of the one or more other playback devices that is also connected to the second network device, the second audio content for playback in synchrony with the at least one of the one or more other playback devices; and
the program instructions that, when executed by the at least one processor, cause the playback device to play back the received second audio content comprise program instructions that, when executed by the at least one processor, cause the playback device to play back the received second audio content in synchrony with the at least one of the one or more other playback devices.

7. The playback device of claim 1, wherein the program instructions that, when executed by the at least one processor, cause the playback device to connect to the first network device comprise program instructions that, when executed by the at least one processor, cause the playback device to connect to the first network device via a Bluetooth connection.

8. The playback device of claim 1, wherein the playback device further comprises:
a first network interface, wherein the program instructions that, when executed by the at least one processor, cause the playback device to connect to the first network device via the first wireless communication link comprise program instructions that, when executed by the at least one processor, cause the playback device to connect to the first network device via the first network interface; and
a second network interface, wherein the program instructions that, when executed by the at least one processor, cause the playback device to automatically connect to the second network device via the second wireless communication link comprise program instructions that, when executed by the at least one processor, cause the playback device to connect to the second network device via the second network interface.

9. The playback device of claim 1, wherein the first set of configuration parameters comprises an identifier of the first network device and a security parameter for the first network device.

10. The playback device of claim 1, wherein the network list is a first network list, the playback device further comprising program instructions that, when executed by the at least one processor, cause the playback device to:
after connecting to the second network device, receive, from at least one of the one or more other playback devices that is connected to the second network device, a second network list including a third set of configuration parameters for connecting to a third network device; and
store the third set of configuration parameters.

11. The playback device of claim 1, further comprising program instructions that, when executed by the at least one processor, cause the playback device to:
after automatically connecting to the second network device using the second set of configuration parameters, disconnect from the second network device; and
reconnect to the first network device using the stored first set of configuration parameters.

12. The playback device of claim 1, wherein the program instructions that, when executed by the at least one processor, cause the playback device to add the second set of configuration parameters to the network list stored by the playback device comprise program instructions that, when executed by the at least one processor, cause the playback device to increment a version number of the network list.

13. A non-transitory computer-readable medium, wherein the non-transitory computer-readable medium is provisioned with program instructions that, when executed by at least one processor, cause a playback device to:
connect to a first network device via a first wireless communication link using a first set of configuration parameters for connecting to the first network device;
store the first set of configuration parameters;

before disconnecting from the first network device and prior to causing the playback device to join a networked playback system associated with a second network device:
  receive, from the first network device, audio content for playback;
  play back the received audio content;
  automatically receive, from the first network device, information for joining the networked playback system, the information comprising a second set of configuration parameters for connecting to the second network device associated with the networked playback system, the second set of configuration parameters being different from the first set of configuration parameters; and
  add the second set of configuration parameters to a network list stored by the playback device;
disconnect from the first network device; and
while the playback device is positioned within range to wirelessly connect to the second network device:
  automatically connect to the second network device via a second wireless communication link using the second set of configuration parameters for connecting to the second network device; and
  in response to automatically connecting to the second network device, automatically join the networked playback system among one or more other playback devices that are members of the networked playback system.

14. The non-transitory computer-readable medium of claim 13, wherein the audio content for playback is first audio content for playback, and wherein the non-transitory computer-readable medium is also provisioned with program instructions that, when executed by at least one processor, cause the playback device to:
  after disconnecting from the first network device and while connected to the second network device, receive, from the second network device, second audio content for playback; and
  play back the received second audio content.

15. The non-transitory computer-readable medium of claim 14, wherein the program instructions that, when executed by at least one processor, cause the playback device to receive, from the first network device, the first audio content for playback comprise program instructions that, when executed by at least one processor, cause the playback device to receive, from the first network device, streaming media content received by the first network device from a cloud based computing system associated with a streaming media service.

16. The non-transitory computer-readable medium of claim 15, wherein the program instructions that, when executed by at least one processor, cause the playback device to receive, from the second network device, the second audio content for playback comprise program instructions that, when executed by at least one processor, cause the playback device to:
  receive, from a computing device that is also connected to the second network device, one or more media item identifiers; and
  utilize the one or more media item identifiers to retrieve, from a cloud based computing system associated with a streaming media service, the second audio content for playback.

17. The non-transitory computer-readable medium of claim 16, wherein the computing device is the first network device.

18. The non-transitory computer-readable medium of claim 15, wherein:
  the program instructions that, when executed by at least one processor, cause the playback device to receive, from the second network device, the second audio content for playback comprise program instructions that, when executed by at least one processor, cause the playback device to receive, from at least one of the one or more other playback devices that is also connected to the second network device, the second audio content for playback in synchrony with the at least one of the one or more other playback devices; and
  the program instructions that, when executed by at least one processor, cause the playback device to play back the received second audio content comprise program instructions that, when executed by at least one processor, cause the playback device to play back the received second audio content in synchrony with the at least one of the one or more other playback devices.

19. The non-transitory computer-readable medium of claim 13, wherein the program instructions that, when executed by at least one processor, cause the playback device to connect to the first network device comprise program instructions that, when executed by at least one processor, cause the playback device to connect to the first network device via a Bluetooth connection.

20. A method carried out by a playback device, the method comprising:
  connecting to a first network device via a first wireless communication link using a first set of configuration parameters for connecting to the first network device;
  storing the first set of configuration parameters;
  before disconnecting from the first network device and prior to causing the playback device to join a networked playback system associated with a second network device:
    receiving, from the first network device, audio content for playback;
    playing back the received audio content;
    automatically receiving, from the first network device, information for joining the networked playback system, the information comprising a second set of configuration parameters for connecting to the second network device associated with the networked playback system, the second set of configuration parameters being different from the first set of configuration parameters; and
    adding the second set of configuration parameters to a network list stored by the playback device;
  disconnecting from the first network device; and
  while the playback device is positioned within range for wirelessly connecting to the second network device:
    automatically connecting to the second network device via a second wireless communication link using the second set of configuration parameters for connecting to the second network device; and
    in response to automatically connecting to the second network device, automatically joining the networked playback system among one or more other playback devices that are members of the networked playback system.

* * * * *